United States Patent

[11] 3,615,815

| [72] | Inventor | Eugene Wainer<br>Shaker Heights, Ohio |
|---|---|---|
| [21] | Appl. No. | 804,018 |
| [22] | Filed | Mar. 3, 1969 |
| [45] | Patented | Oct. 26, 1971 |
| [73] | Assignee | Horizons Incorporated, a Division of<br>Horizons Research Incorporated |

[54] METAL CLEANING PROCESS
12 Claims, No Drawings

[52] U.S. Cl. .................................................... 134/2,
134/5, 134/19, 134/21, 134/26, 134/29, 134/38, 134/42
[51] Int. Cl. ............................................... C23g 1/28, C23g 1/32
[50] Field of Search............................................ 134/2, 5, 19, 20, 39, 42, 29, 37, 38, 26, 21

[56] References Cited
UNITED STATES PATENTS

| 2,377,876 | 6/1945 | Gilbert | 134/2 |
|---|---|---|---|
| 2,676,900 | 4/1954 | Spence | 134/2 |
| 2,738,294 | 3/1956 | Spence | 134/42 |
| 2,760,927 | 8/1956 | Webster | 134/42 X |
| 2,891,881 | 6/1959 | Jaffe | 134/2 |
| 3,000,766 | 9/1961 | Wainer | 134/2 |
| 3,015,589 | 1/1962 | Everson | 134/42 |
| 1,714,879 | 5/1929 | Lang | 134/2 X |
| 1,726,623 | 9/1929 | Hollnagel | 134/42 X |
| 2,380,284 | 7/1945 | Young | 134/2 X |
| 2,474,674 | 6/1949 | Holden | 134/29 X |
| 2,796,366 | 6/1957 | Carter | 134/2 |
| 2,939,209 | 6/1970 | Schwartz | 134/38 X |
| 2,977,255 | 3/1961 | Lowry | 134/38 X |
| 3,030,239 | 4/1962 | Mekjean et al. | 134/29 |
| 3,342,638 | 9/1967 | Wanzenberg | 134/42 X |
| 3,424,614 | 1/1969 | Lichte | 134/2 |

FOREIGN PATENTS

| 118,807 | 8/1944 | Australia | 134/29 |
|---|---|---|---|

*Primary Examiner*—Morris O. Wolk
*Assistant Examiner*—Barry S. Richman
*Attorney*—Lawrence I. Field

ABSTRACT: This invention is an improvement on my U.S. Pat. No. 3,000,766 and is directed to the recovery of metal values in scrap materials by separating the metal values from any nonmetallic material associated therewith, such as insulation on wires or other electrical equipment. The improvement resides in carrying out the removal of unwanted nonmetallic materials in two separate stages, the second of which is similar to that described in U.S. Pat. No. 3,000,766, but is carried out much more efficiently because of the treatment which prepares the scrap for this step. In the first stage, a substantial amount of the nonmetallic material is removed by either burning or immersion in a nonoxidizing fused salt melt.

METAL CLEANING PROCESS

This invention relates to the recovery of metal values in scrap material and to the salvaging of metal from any accompanying nonmetallic material associated therewith in a two-stage process. The first stage involves treatment in a fused salt melt maintained at a temperature below the melting point of the metal being treated and with an oxygen-free atmosphere maintained above the bath. This first treatment may be designated as "nonreactive," since the nonmetallic materials present on the metal parts to be treated, such as organic insulation on wire, are pyrolyzed or charred without oxidation. An alternative procedure for this first treatment is controlled atmosphere burning to remove such nonmetallic material from the accompanying metal. The waste material with any attached char is then passed to a reactive melt in which all traces of organic insulation are burned off or oxidized leaving a metal which after washing and drying, is cleaned completely of contamination and is maintained in its original shape. A further modification of the process, particularly with regard to the bath composition in either the first or second step, permits removal of inorganic insulation, such as glass cloth, vitreous enamel or ceramic coatings. This modification is achieved by including in one or the other salt melt a small amount of material which will react chemically with such inorganic insulation, such inorganic insulation not being subject to pyrolysis.

In U.S. Pat. No. 3,000,766 I have described a process which is applicable to all of the ferrous and nonferrous metals and alloys usually found as scrap awaiting salvage. In the process described in U.S. Pat No. 3,000,766 the scrap, which may contain coatings of either organic or inorganic material or both, is charged into a fused salt bath operated at temperatures between 450° and 550° C., said fused salt bath comprising either sodium nitrite, mixtures of sodium nitrate and sodium nitrite, or mixtures of sodium nitrite, sodium nitrate, and sodium hydroxide. This melt may be described as "reactive" and is strongly oxidizing. This oxidizing character is maintained by bubbling air through the fused salt either during the operation or between operations for reconstitution of the oxidizing characteristic of the melt. The oxidizing action is extremely vigorous and takes place below the surface of the melt and at the surface. The organic constituents are burned with extreme rapidity. Under proper conditions of operation the smoke which is emitted from the surface is practically white and thin and consists primarily of a mixture of carbon monoxide, carbon dioxide, water vapor and sometimes contains the oxides of sulfur If polyvinylchloride is present in the insulation, in addition to the foregoing gases, HCl may be present.

In addition to the capability of the molten salt compositions described in U.S. Pat. No. 3,000,766, for rapid oxidation of organic material, these melts exhibit the further feature of being able to oxidize almost equally as rapidly, as residues that are comprised almost entirely of carbon, such as the type of char which may remain as a consequence of complete pyrolysis of an organic material in an inert atmosphere. Further, salt melts which contain a small amount of sodium hydroxide are capable of removing inorganic insulation, particularly of the silicate type, which very often is used as a basis for the coating of wire. In this case, the silicate types are dissolved by the caustic component yielding the corresponding alkali silicates. Quite often fillers based on clay are used in the insulation referred to and these clay fillers are either attacked by the caustic with extreme rapidity or in case the clay content of such fillers is low, as would be the case when the filler is based on calcium carbonate, for example, the material remains as a sludge in the bath which may be removed periodically by raking techniques without destroying the efficiency of the bath itself.

Although the fused salt baths and techniques described in U.S. Pat. No. 3,000,766 are extremely effective in producing a clean, useful metallic product with a minimum of contamination whether the insulation is organic or inorganic, certain operating difficulties have impeded the commercial utilization of the patented procedures.

The exceptionally powerful oxidizing character of the bath reduces the tonnage production capability of the bath for commercial purposes to an undesirable extent.

Then too, if too much material is introduced into the bath at one time, oxidation is not complete and a significant portion of the organic contaminant is emitted from the bath in the form of undesirable black smoke which becomes an atmospheric contaminant, not permitted in may locations.

Further, if too much raw material is introduced into the bath at one time, the violence of the oxidizing action causes excessive bubbling and frothing which, in many cases, proceeds to such an extent that substantial portions of the fused salt bath may be thrown explosively out of the container. When relatively smaller amounts of raw material are processed the bath will operate safely and properly in accordance with the teachings of U.S. Pat. No.3,000,766. However, in order to treat the very large tonnages of scrap that are available, installations of considerable size would be required in order to treat such a volume of scrap properly, and such huge installations may then become economically unattractive.

I have found that the productive thruput of the molten salt compositions described in U.S. Pat. No. 3,000,766 may be increased by several orders of magnitude by first treating the scrap in a "nonreactive" fused salt bath, or by a preliminary removal of associated nonmetallic materials by burning. The term "nonreactive" is intended to define this type of bath as one which is not capable of oxidizing the organic material and the surface of this type of bath is covered with a gas blanket of nonoxidizing material, such as carbon dioxide or nitrogen, to further prevent such oxidation. The same molten salt composition may be "reactive" with regard to inorganic insulation where removal is not a function of oxidation and in such cases this type of reaction involves the inclusion of active chemicals which will react with the siliceous type of filler or coating which is sometimes used in insulated wire components without introducing an oxidative component for the organic constituents. In this separation, the organic constituents are pyrolyzed or destructively distilled or may actually melt away from the wire and float to the top of the bath in the form of a tar in which case this molten tar may be removed by mechanical means. More often than not this softening and fusion of the insulation will take place since a large portion of the insulation used for wire, and particularly copper wire, is thermoplastic in nature. Thereafter, the residual salt may be removed either by washing in water followed by drying or the treated scrap may be inserted directly in the type of bath described in U.S. Pat. NO. 3,000,766 with its attendant air introduction. By proceeding in this manner, very much less organic material is required to be catalytically burned by the reactive fused salt compositions of U.S. Pat. No. 3,000,766 and the amount of material which may be inserted at any one time into the melt may be increased by a factor of 10 to 100 over that which normally could be utilized if unprocessed material were inserted directly in the reactive bath.

In our present complex of society much effort is devoted to the extraction of metals from their ores and their ultimate incorporation in useful devices such as electrical equipment, cable, conduits, fittings, containers, castings and a host of other useful end items. When, for one reason or another, the end item has served its useful purpose or becomes technologically obsolete, it is often dumped on a junk heap principally because the cost of recovery of the metal exceeds its resale value. This is particularly true when the metal is in the form of small pieces of wire or armored cable or small parts coated with lacquers, paints rubber, plastics or other organic materials or fiber glass or inorganic fibers, vitreous enamel, or ceramic coatings.

One object of my invention is to separate industrial waste materials of metallic nature into recoverable useful solid metal portion and a disposable nonmetallic residue. Another object of my invention is to provide a method wherein organic materials associated with the scrap, usually in the form of coatings, may be removed from the metal values without accompanying objectionable pollution of the atmosphere, leaving the scrap metal as a solid clean product. A still further object of my invention is to provide a means for removing inorganic insulation which may or may not be associated with organic insulation, such inorganic insulation being taken from the class of glass fiber, ceramic fiber, vitreous enamel, or ceramic coatings.

These and other objects will become apparent from the description which follows.

In general the salts utilized in formulating the nonreactive baths in which the first portion of the process is carried out comprise mixtures of alkali metal and/or alkaline earth metal halides, borates, carbonates, hydroxides and phosphates. The chlorides of the alkali metals and alkaline earth metals are particularly preferred because they are relatively inexpensive and readily available.

Examples of compositions suitable as nonreactive baths in the sense used in this specification are given in table I and table II.

TABLE I

Nonreactive Cleaning Baths (% by weight)

| No. | Composition | Use Temperature |
|---|---|---|
| 1. | 28% LiCl+72% KCl | 360° C. to 500° C. |
| 2. | 94% BaCl$_2$+6% LiCl | 525° C. to 600° C. |
| 3. | 37–53% NaCl+63–47% MgCl$_2$ | 475° C. to 550° C. |
| 4. | 38–54% KCl+62–46% MgCl$_2$ | 485° C. to 550° C. |
| 5. | 65–40% K$_2$CO$_3$+35–60% Li$_2$CO$_3$ | 500° C. to 600° C. |
| 6. | 40% LiBO$_2$+50% NaBO$_2$+ 10 % NaCl | 550° C. to 650° C. |
| 7. | 72–47% KPO$_3$+28–53% LiPO$_3$ | 600° C. to 650° C |

TABLE II
Nonreactive cleaning baths for scrap other than aluminum, brass and zinc scrap

| | Composition (percent) | | | | | Recommended use |
|---|---|---|---|---|---|---|
| No. | NaOH | KOH | NaF | CaF$_2$ | BaCl$_2$ | temperature |
| 8. | 75–95 | 0.5–12 | | | 0.5–20 | 350° C to 750° C (540 to 650° C preferred) |
| 9. | 50–90 | 10–30 | 0.5–10 | | | 315° C to 595° C (480–540° C preferred) |
| 10. | 50–75 | 25–50 | | | | 400 to 450° C |
| 11. | 80–90 | | | 10–20 | | 400 to 500° C |
| 12. | 70 | 20 | | 10 | | 400 to 500° C |

TABLE III

Reactive Bath Compositions (% by weight)

| | NaNO$_3$ | NaNO$_2$ | NaOH |
|---|---|---|---|
| 13. | 100% | | |
| 14. | 25% | 75% | |
| 15. | 50% | 50% | |
| 16. | 50% | 40% | 10% |
| 17. | 35% | 55% | 10% |

The compositions listed in table I may be utilized for treating substantially any commercial scrap whether ferrous or nonferrous. The temperature of recommended use is below the melting point of aluminum, usually the lowest melting point metal found in any significant quantities in the scrap industry.

Inert atmospheres which may be used above the melt in the case of the compositions of table I may be either carbon dioxide, nitrogen or ammonia, carbon dioxide being preferred because of cost. This gas may be introduced below the level of the melt itself or it may be blown across the top of the melt. Compositions No. 1 through 4 are specifically designed for organic insulation, except the type of organic insulation that contains any substantial amount of inorganic filler or siliceous character. Compositions No. 5 through 7 are intended for either organic or inorganic insulation. The melting point of compositions No. 5 through 7 may be further reduced by adding up to 20 percent of either sodium or potassium chloride or mixtures thereof. While compositions No. 1 through 4 are designed specifically for organic insulation, they may be modified to handle other types of insulation by adding up to 10 percent sodium hydroxide which still permits the melt to be used for metallic aluminum recovery without any major deleterious reaction, while at the same time the compositions is sufficiently active for disintegrating inorganic insulations based on silicates and carbonates The compositions given in table II are specifically designed for processing copper scrap and ferrous alloy scrap, and are not recommended for use as a preliminary cleanup for aluminum alloys in view of the possibility of rapid decomposition of aluminum metal in the molten alkali. With the compositions of table II the preferred inert atmosphere above the melt is nitrogen or ammonia, nitrogen being preferred. Carbon dioxide cannot be used in view of the formation of carbonates as a consequence of absorption by the molten caustic and the consequent increase in the melting point of the bath composition. The peculiar nature of operation of this bath in its nonreactive form against plastics and resins which contain both carbon and oxygen and with the use of the inert atmospheres recommended is that in pyrolysis of this type of resin, carbon monoxide is formed which is expelled as such from the bath into the gaseous stream above the bath without forming carbon dioxide, thereby preventing the formation of the undesired carbonates from the base constituents in the bath itself. The use of ammonia as an inert atmosphere is much more effective in the prevention of formation of the carbon dioxide than nitrogen though for most purposes nitrogen serves adequately. Table III sets forth examples of compositions like those in U.S. Pat. No. 3,000,766 and which are suitable for thermal cleanup purposes. Of these compositions, the mixture containing approximately 50 percent of sodium nitrite and 50 percent of sodium nitrate is preferred operating at a temperature between 500° and 550° C., when the amount of siliceous insulation remaining on the wire is low or absent. With larger amounts of siliceous insulation the composition comprising 50 parts of sodium nitrite, 40 parts of sodium nitrate and 10 parts of sodium hydroxide is the preferred composition and air is used as before to maintain the oxidative potential of the molten salt composition.

As indicated previously, the preferred mode of operation in the present invention comprises a first treatment in the nonreactive melt for intervals of between 30 seconds and 5 minutes, followed by quenching in water and washing followed by drying and thereafter a second treatment by immersion in the reactive salt melt for not longer than 2 minutes, between 20 seconds and 90 seconds generally being sufficient, followed by quenching in water, washing and drying. One variation on this procedure omits the intermediate washing step and allows the material to pass directly from immersion in the first, nonreactive melt into the second, reactive salt melt. Another variation of the procedure described may be utilized within the intended scope of my two-step process for rapid cleaning of metals. In portions of the country where open air burning is permitted, clean metal may be obtained by the two-step process in which the scrap metal with its attendant organic insulation is first burned in accordance with permitted burning procedure and is thereafter cleaned by a short time immersion in the reactive fused slat compositions of the type exemplified in table III providing the temperature of these baths is at least 500° C.

The following examples will serve to further illustrate the invention and are not intended to limit the invention in any way.

EXAMPLE 1

One hundred pounds of a mixture of LiCL and KCL proportioned in accordance with composition No. 1 table I was fused in a heated 7 gallon iron pot and the fused slat melt was maintained at 500° C. A 25 pound bale of insulated copper wire, the insulation being neoprene, was placed in a metal basket comprised of one-fourth inches mesh iron screen and the metal basket was then immersed in the fused salt melt, the material being retained therein for 2½ minutes. An inert atmosphere of carbon dioxide was maintained over the surface of the melt by bubbling carbon dioxide through the melt by means of submerged diffusers. Within 30 seconds after the neoprene covered scrap (approximately 50 percent neoprene and 50 percent metal) was immersed in the salt melt a dark colored liquid tar appeared on the surface and the evolution of this tar was complete within about 1 to 1.5 minutes. During the tar formation considerably evolution of colorless gas occurred, such gaseous products being vented to a stack which was provided with a water curtain to cool the gases and thereafter the gases were vented to the atmosphere. The tar was removed from the surface of the salt melt with a metal scraper after which the products remaining in the basket were removed from the fused salt melt (total immersion time 2½ minutes) and quenched in water. After washing and drying the product, it was found that approximately 85 percent of the original neoprene insulation had been removed from the surface of the copper. The dried product was when immersed in a 7 gallon melt made up in accordance with the nitrite-nitrate composition No. 15 of table III, said bath also maintained at 500° C. Preheated air was bubbled through the melt during such immersion. The basket and its impure copper wire batch was retained in this salt melt for 60 seconds during which time quiet bubbling took place starting at a rapid rate immediately on immersion and falling off to no bubbling within about 45 seconds after immersion. After removal from this second melt, quenching in water washing and drying, 12-½ pounds of clean copper wire showing a clean red color with no attendant char or slag particles was obtained. The copper wire was soft and flexible and appeared to have lost none of its physical or mechanical properties. Analysis indicated that the copper was in excess of 99 percent purity.

EXAMPLE 2

Example 1 was repeated except that 15 pounds of neoprene rubber covered aluminum scrap was used instead of the neoprene covered copper wire. Again, a clean silvery appearing product exhibiting no apparent loss in mechanical and physical properties was obtained and the aluminum wire exhibited substantially the same analysis as clean material.

EXAMPLE 3

Example 1 was repeated, except that Composition No. 2 of table 1 maintained at 600° C. was utilized for the first step and the time for preliminary cleaning in Composition No. 1 was 90 seconds and the time for cleaning in composition No. 15 was 60 seconds.

EXAMPLE 4

Example 1 was repeated, except that composition No. 3 of table 1 was utilized at 500° C. for the first step in the process. The time of immersion in the first composition was 2 minutes and the time for cleaning in the second reactive composition was 70 seconds.

EXAMPLE 5

Example 4 was repeated, except that immediately on completion of the operation in the first nonreactive melt, after the basket was lifted out of the pot, the molten residual salt was allowed to drain completely and the basket with its impure content was immersed directly in the reactive melt of composition No. 15. A clean end product was again obtained.

EXAMPLE 6

Example 1 was repeated except that composition No. 4 of table I was used for the precleaning operation at 550° C. for an immersion time of approximately 2 minutes and after washing and drying was followed by an immersion in composition No. 15 for a period of 60 seconds to complete the cleaning.

EXAMPLE 7

In three separate runs, three batches of copper wire scrap was processed. A first batch was processed in composition No. 5 at 600° C. for 100 seconds; a second batch was processed in composition No. 6 of table I at 650° for 80 seconds; and the third batch was processed in composition No. 7 of table I at 650° C. for 60 seconds. In each case, the residual salt was removed simply by draining and immersing (without intervening washing and drying) directly in a salt melt of composition No. 16 for a time period of 90 seconds. After quenching in water, washing and drying, again a clean copper product was obtained in each instance.

EXAMPLE 8

Twenty-five pounds of stainless steel wire containing approximately 40 percent of a vinyl coating on its surface was immersed in 100 pounds of a salt melt composed of composition No. 8 at a temperature of 600° C. for two minutes. The controlled atmosphere utilized in this instance was tank nitrogen and the time of immersion for precleaning was 90 seconds. After scraping the top of the bath to remove the tars which had been formed, the batch was then immersed without intervening washing and drying into a second fused salt melt maintained at 500° C. in accordance with composition No. 17 for an immersion time of 90 seconds. After washing and drying, clean stainless steel wire was obtained in 100 percent yield in which case the stainless steel wire appeared to have retained all of the mechanical and physical properties it had exhibited prior to the immersion in the salt bath.

EXAMPLE 9

Twenty-five pounds of copper wire covered with a vinyl type insulated coating in the amount of 45 percent by weight vinyl coating and 55 percent by weight of copper was treated in successive runs in salt baths in accordance with composition No. 2, operated at 550° C., time of immersion 100 seconds; a separate batch treated in composition No. 10 operated at 450° C. for an immersion time of 120 seconds; in a further run another batch was immersed in a melt consisting of the composition No. 11 operated at 500' C. for an immersion time of 110 seconds; and in a final run another batch was immersed in a melt consisting of the composition No. 12, operated at 500° C. for an immersion time of 110 seconds. In each case and without intervening washing and drying, the salt was allowed to drain as completely as possible from the partially cleaned copper scrap and the processed scrap was thereafter immersed in the final cleanup consisting of the composition No. 14 for a period of 45 seconds, after which the batch was quenched in water, washed and dried. Again, in each instance, a clean useful product was achieved.

EXAMPLE 10

A forty pound batch of copper wire containing fiber glass insulation in the amount of 15 percent of the total weight of the batch was immersed in bath composition No. 10 at 450° C.

for 120 seconds, after which the salt was allowed to drain as completely as possible and the batch was then immersed in a melt consisting of composition No. 16 for a period of 60 seconds, after which the material was quenched in water, washed and dried, and again a clean product was obtained without any evidence of the presence of slag.

EXAMPLE 11

Fifty pounds of neoprene covered copper wire comprising 25 pounds of copper and 25 pounds of neoprene was ignited inside a metal basket and allowed to burn freely in the open air. A smoky, yellow flame producing voluminous black smoke accompanied the combustion which required approximately 27 minutes for its completion. After burning, the residual charge weighed 27 pounds including approximately two pounds of contamination. Some small amount of slagging was exhibited. The batch was then immersed in 7 gallons of a melt consisting of composition No. 16 for 120 seconds, after which all obvious chemical reaction had ceased. After quenching in water and washing and drying, 25 pounds of clean flexible copper was obtained.

Having now described preferred embodiments of the invention, it is not intended that it be limited except as may be required by the appended claims.

I claim:

1. In a process in which the metal in metal containing scrap is separated from both the combustible and noncombustible nonmetallic material with which it is contaminated by immersion of the scrap in a reactive oxidizing fused salt melt consisting essentially of an alkali metal nitrite, while said melt is maintained at a temperature below the melting point of the scrap metal, the improvement whereby the useful like and efficiency of the reactive fused salt melt are increased which comprises:

removing a substantial portion of the combustible nonmetallic material associated with said scrap prior to immersion of said scrap in the reactive fused salt melt, said removal being effected by burning said nonmetallic material.

2. In a process in which the metal in metal-containing scrap is separated from both the combustible and noncombustible nonmetallic material with which it is contaminated by immersion of the scrap in a reactive oxidizing fused salt melt consisting essentially of an alkali metal nitrite, while said melt is maintained at a temperature below the melting point of the scrap metal, the improvement whereby the useful like and efficiency of the reactive fused salt melt are increased which comprises:

removing a substantial portion of the nonmetallic material associated with said scrap prior to immersion of said scrap in the reactive fused salt melt, comprises removal being effected by immersion of the scrap in a nonoxidizing fused salt melt maintained nonoxidizing and at a temperature between about 350° C. and 70° C.

3. The process of claim 2, wherein the duration of the immersion in the second treating step is between about 20 seconds and about 2 minutes.

4. The process of claim 2, wherein the scrap is washed and dried after the first immersion and before the second immersion.

5. The process of claim 2 in which the metal scrap being processed is cupreous scrap and wherein said nonoxidizing fused salt melt consists essentially of at least one alkali metal hydroxide.

6. The process of claim 2 in which the metal scrap being processed is ferrous scrap and wherein said nonoxidizing fused salt melt consists essentially of at least one alkali metal hydroxide.

7. The process of claim 2 in which the metal scrap being processed is ferrous scrap and wherein said nonoxidizing fused salt melt comprise at least two salts taken from the group consisting of alkali halides, alkaline earth halides, alkali carbonates, alkali borates, alkali phosphates, an mixtures thereof.

8. The process of claim 2 in which the metal scrap being processed in nonferrous scrap and wherein said nonoxidizing fused salt melt comprises at least two salts taken from the group consisting of alkali halides, alkaline earth halides, alkali carbonates, alkali borates, alkali phosphates, and mixtures thereof.

9. The process of claim 2 in which the metal scrap being processed is copper scrap and wherein said nonoxidizing fused salt melt comprises at least two salts taken from the group consisting of alkali halides, alkaline earth halides, alkali carbonates, alkali borates, alkali phosphates, and mixtures thereof.

10 The process of claim 2 wherein said nonoxidizing fused salt melt comprises at least two salts taken from the group consisting of alkali halides, alkaline earth halides, alkali carbonates, alkali borates alkali phosphates, and mixtures thereof which is maintained molten under a nonoxidizing atmosphere.

11. The process of claim 10 wherein the nonoxidizing atmosphere comprises a gas selected from the group consisting of $CO_2$, $N_2$ and $NH_3$.

12. The process of claim 10 wherein the nonoxidizing atmosphere is maintained by bubbling a gas selected from the group consisting of $CO_2$, $N_2$ and $NH_3$ into the fused salt melt.

* * * * *